(12) United States Patent
Sasaki

(10) Patent No.: US 11,662,578 B2
(45) Date of Patent: *May 30, 2023

(54) IMAGE DISPLAY DEVICE

(71) Applicant: SAMSUNG ELECTRONICS CO., LTD., Suwon-si (KR)

(72) Inventor: Katsutoshi Sasaki, Kanagawa (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 49 days.

This patent is subject to a terminal disclaimer.

(21) Appl. No.: 17/339,498

(22) Filed: Jun. 4, 2021

(65) Prior Publication Data
US 2021/0294098 A1 Sep. 23, 2021

Related U.S. Application Data

(63) Continuation of application No. 16/148,026, filed on Oct. 1, 2018, now Pat. No. 11,067,800.

(30) Foreign Application Priority Data

Oct. 4, 2017 (JP) ................................. 2017-194273
Jul. 30, 2018 (KR) ........................ 10-2018-0088669

(51) Int. Cl.
*G02B 26/08* (2006.01)
*G02B 27/01* (2006.01)
(Continued)

(52) U.S. Cl.
CPC ....... *G02B 27/0101* (2013.01); *G02B 5/0215* (2013.01); *G02B 5/0231* (2013.01);
(Continued)

(58) Field of Classification Search
CPC .............. G02B 27/0101; G02B 5/0215; G02B 5/0231; G02B 5/0257; G02B 5/0284;
(Continued)

(56) References Cited

U.S. PATENT DOCUMENTS 5,781,317 A 7/1998 Kawazoe et al.
6,157,473 A 12/2000 Jang et al.
(Continued)

FOREIGN PATENT DOCUMENTS

EP 2318879 B1 6/2017
JP 3-107118 A 5/1991
(Continued)

OTHER PUBLICATIONS

Communication dated Jul. 20, 2021 issued by the Japanese Patent Office in application No. 2017-194273.

*Primary Examiner* — Euncha P Cherry
(74) *Attorney, Agent, or Firm* — Sughrue Mion, PLLC

(57) ABSTRACT

Provided is an image display device including an optical scanner configured to scan light emitted from a light source, a parallel light generator configured to generate the scanned light as parallel light, a prism configured to refract the parallel light, and a light direction changer including a plurality of points whereon the parallel light refracted by the prism is incident and configured to reflect or diffract the parallel light and change a traveling direction of the parallel light, wherein the prism is provided on a path of each light traveling from the optical scanner to the light direction changer to adjust an optical path difference of parallel light incident on each of the plurality of points of the light direction changer.

14 Claims, 17 Drawing Sheets

(51) Int. Cl.
  *G02B 27/30* (2006.01)
  *G02B 26/10* (2006.01)
  *G02B 5/02* (2006.01)
  *G02B 27/00* (2006.01)

(52) U.S. Cl.
  CPC ......... *G02B 5/0257* (2013.01); *G02B 5/0284* (2013.01); *G02B 26/0833* (2013.01); *G02B 26/10* (2013.01); *G02B 26/101* (2013.01); *G02B 27/0081* (2013.01); *G02B 27/30* (2013.01); *G02B 2027/011* (2013.01)

(58) Field of Classification Search
  CPC ............... G02B 26/0833; G02B 26/10; G02B 26/101; G02B 27/0081; G02B 27/30; G02B 2027/011
  See application file for complete search history.

(56) References Cited

U.S. PATENT DOCUMENTS

| | | | |
|---|---|---|---|
| 8,400,713 B2 | 3/2013 | Grasser | |
| 8,403,490 B2 | 3/2013 | Sugiyama et al. | |
| 9,229,224 B2 | 1/2016 | Mizoguchi et al. | |
| 11,067,800 B2* | 7/2021 | Sasaki | G02B 5/0215 |
| 2001/0010598 A1 | 8/2001 | Aritake et al. | |
| 2002/0018185 A1 | 2/2002 | Kuramochi et al. | |
| 2006/0119951 A1 | 6/2006 | McGuire, Jr. | |
| 2012/0002256 A1 | 1/2012 | Lacoste et al. | |
| 2013/0286362 A1 | 10/2013 | Imai | |
| 2014/0268358 A1 | 9/2014 | Kusaka et al. | |
| 2014/0340286 A1* | 11/2014 | Machida | G02B 27/017 345/8 |
| 2015/0198802 A1 | 7/2015 | Ando et al. | |
| 2015/0219803 A1* | 8/2015 | Inamoto | G02B 27/0101 359/627 |
| 2015/0219895 A1 | 8/2015 | Laycock et al. | |
| 2017/0285341 A1* | 10/2017 | Nakagawa | G02B 27/0101 |
| 2017/0336628 A1 | 11/2017 | Kim et al. | |

FOREIGN PATENT DOCUMENTS

| | | |
|---|---|---|
| JP | 6-107037 A | 4/1994 |
| JP | 7-146636 A | 6/1995 |
| JP | 2897182 B2 | 5/1999 |
| JP | 2001290102 A | 10/2001 |
| JP | 2001311905 A | 11/2001 |
| JP | 2004-126226 A | 4/2004 |
| JP | 2011-166396 A | 8/2011 |
| JP | 2012-501472 A | 1/2012 |
| JP | 2014174494 A | 9/2014 |
| JP | 2015145962 A | 8/2015 |
| JP | 5983055 B2 | 8/2016 |
| JP | 6081603 B2 | 2/2017 |
| JP | 6201339 B2 | 9/2017 |
| WO | 2009/041055 A1 | 4/2009 |
| WO | 2012111698 A1 | 8/2012 |
| WO | 2013111471 A1 | 8/2013 |

* cited by examiner

FIG. 5

| INCIDENCE ANGLE Θ(deg) | INCIDENCE ANGLE Θ(deg) ΔOP(mm) | Wo(Ømm) | W(Ømm) |
|---|---|---|---|
| 7.7 | 11.171 | 0.061 | 0.086 |
| 10 | 14.448 | 0.069 | 0.098 |
| 20 | 28.456 | 0.097 | 0.137 |
| 30 | 41.600 | 0.117 | 0.166 |
| 40 | 58.480 | 0.133 | 0.188 |
| 50 | 63.735 | 0.145 | 0.205 |

FIG. 6

| INCIDENCE ANGLE Θ(deg) | 81.22 | 80 | 70 | 60 | 50 | 40 | 30 | 20 | 10 | 5 | 1 |
|---|---|---|---|---|---|---|---|---|---|---|---|
| MAXIMUM OPTICAL PATH DIFFERENCE(mm) | 82.225 | 81.936 | 78.182 | 72.053 | 63.735 | 53.480 | 41.600 | 28.456 | 14.448 | 7.251 | 1.452 |
| APEX ANGLE OF WEDGE PRISM(deg) | 81.00 | 80.57 | 75.13 | 67.02 | 57.15 | 46.27 | 34.89 | 23.31 | 11.66 | 5.83 | 1.17 |

IMAGE DISPLAY DEVICE

CROSS-REFERENCE TO RELATED APPLICATION

This application in a continuation of U.S. application Ser. No. 16/148,026, filed Oct. 1, 2018, which claims priority from Japanese Patent Application No. 2017-194273, filed on Oct. 4, 2017, in the Japanese Patent Office, and Korean Patent Application No. 10-2018-0088669, filed on Jul. 30, 2018, in the Korean Intellectual Property Office, the disclosures of which are herein incorporated by reference in their entireties.

BACKGROUND

1. Field

Example embodiments relate to image display devices.

2. Description of the Related Art

Recently, technologies for displaying images with high resolution on image display devices have been actively developed. For example, a head-up display is an image display device that displays a clearer image by correcting chromatic aberration of light emitted from a light source through a prism.

The head-up display may include optical information display means such as a cathode ray tube (CRT), an optical system projecting light emitted from the optical information display means in a predetermined direction, and a screen that the light reaches. The optical system may include a plurality of lenses and mirrors to adjust the traveling direction of light emitted from the CRT to reach the screen.

SUMMARY

One or more example embodiments provide image display devices having a display surface with uniform resolution.

According to an aspect of an example embodiment, there is provided an image display device including an optical scanner configured to scan light emitted from a light source, a parallel light generator configured to generate the scanned light as parallel light, a prism configured to refract the parallel light, and a light direction changer including a plurality of points whereon the parallel light refracted by the prism is incident, and configured to reflect or diffract the parallel light and change a traveling direction of the parallel light, wherein the prism is provided on a path of each light traveling from the optical scanner to the light direction changer, and is configured to adjust an optical path difference of parallel light incident on each of the plurality of points of the light direction changer.

The prism may include a wedge prism.

The optical path difference may be adjusted by changing an apex angle of the wedge prism.

The prism may have an apex angle such that the optical path difference is 0.

The prism may include glass or resin.

The optical scanner may include a micro electro mechanical systems (MEMS) mirror.

The parallel light generator may include a parabolic mirror.

The parallel light generator may include a condenser lens.

The image display device may further include a plane mirror provided between the prism and the light direction changer and configured to reflect light refracted from the prism to be incident on the light direction changer.

The image display device may further include a screen on which light having a traveling direction changed by the light direction changer is incident, and an optical system provided between the screen and the light direction changer and configured to guide the light to be incident on the screen.

The image display device may further include a diffuser between the light direction changer and the optical system, wherein the diffuser is configured to diffuse the light incident from the light direction changer.

A surface of the light direction changer may include a reflective type pattern element.

A surface of the light direction changer may include a reflective type element having a cross-sectional pattern of a plurality of rectangular prism shapes.

A surface of the light direction changer may include a reflective type element having a cross-sectional pattern of a plurality of triangular prism shapes.

A surface of the light direction changer may include a reflective type element having a cross-sectional pattern of a plurality of semi-cylindrical shapes.

A surface of the light direction changer may include a reflective type element having a cross-sectional pattern of a plurality of parabolic shapes.

A surface of the light direction changer may include a reflective type pattern element having a pattern of a plurality of spherical concave lens array.

A surface of the light direction changer may include a reflective type pattern element having a pattern of a plurality of parabolic concave lens array.

BRIEF DESCRIPTION OF THE DRAWINGS

The above and/or other aspects will become apparent and more readily appreciated from the following description of the example embodiments, taken in conjunction with the accompanying drawings in which:

FIG. 5 is a table showing an example of a relationship between an incidence angle of a laser beam with respect to a pattern element, a maximum optical path difference of the laser beam, and a difference in beam diameters of the image display device of FIG. 3 according to an example embodiment;

FIG. 6 is a table showing an example of a relationship between an incidence angle of a laser beam with respect to a light direction changer of FIGS. 1 and 2, a maximum optical path difference of the laser beam, and an apex angle according to an example embodiment;

DETAILED DESCRIPTION

Figure 1:
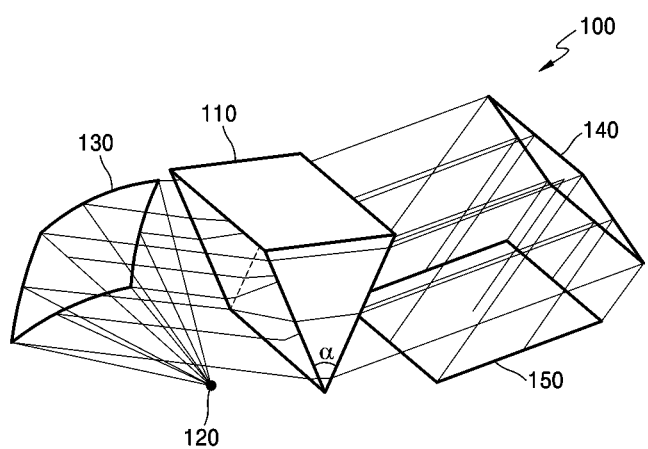
FIG. 1 is a perspective view showing an image display device according to an example embodiment.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects.

Throughout the specification, it will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a perspective view showing an image display device 100 according to an example embodiment.

Figure 2:
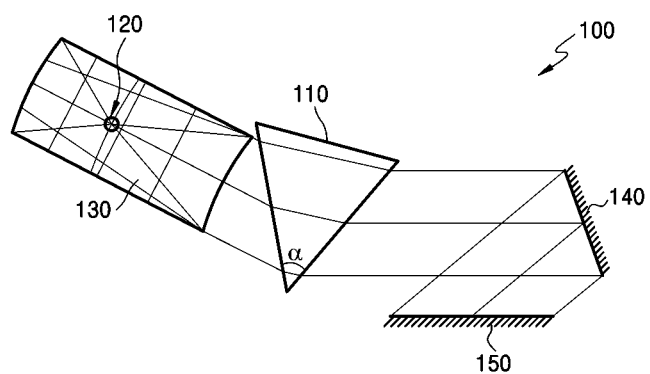
FIG. 2 is a side sectional view showing a side surface of the image display device of FIG. 1 according to an example embodiment.

FIG. 2 is a side sectional view showing a side surface of the image display device 100 of FIG. 1 according to an example embodiment.

The image display device 100 may include, for example, a head-up display, a head-mounted display, a projector, or the like, but is not limited thereto and may include other image display devices.

Referring to FIGS. 1 and 2, the image display device 100 may include an optical scanner 120 (for example, a micro electro mechanical system (MEMS) mirror) scanning light emitted from a light source, a parallel light generator 130 generating the scanned light as parallel light, a prism 110 refracting the parallel light, a plane mirror 140 reflecting the refracted parallel light that passed through the prism 110, and a light direction changer 150 (e.g., a pattern element) changing the traveling direction of the light reflected by the plane mirror 140.

The light emitted from the optical scanner 120 may be the parallel light traveling through a plurality of paths by the parallel light generator 130. The parallel light may be incident on the plane mirror 140 after passing through the prism 110. The parallel light incident on the plane mirror 140 may be reflected and become incident on the light direction changer 150. The direction of the light incident on the light direction changer 150 may be changed and projected on a screen. An optical path difference that may cause a non-uniform resolution of the screen may occur between the lights incident on the light direction changer 150 through the plurality of paths. The prism 110 may adjust the optical path difference between the lights. That is, the prism 110 may reduce or eliminate the optical path difference between the lights. The operating principle of the prism 110 for adjusting the optical path difference will be described later with reference to FIG. 6.

The optical scanner 120 may include a MEMS mirror. The MEMS mirror functions as the optical scanner 120 scanning a laser beam (for example, red light, green light, blue light, or a combination thereof) emitted from a light source by driving of two axes in the horizontal and vertical directions. The MEMS mirror may project an image onto the light direction changer 150. The optical scanner 120 may include the MEMS mirror, but is not limited thereto, and may include a member capable of emitting a laser beam other than the MEMS mirror. The optical scanner 120 may also include a member capable of emitting light other than the laser beam. Further, the light emitted from the optical scanner 120 may be incident on the parallel light generator 130.

Figure 7:
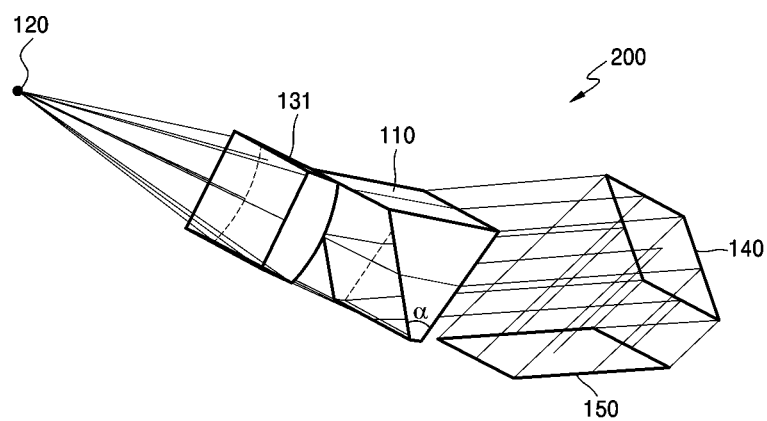
FIG. 7 is a perspective view showing an image display device according to an example embodiment.
Figure 8:
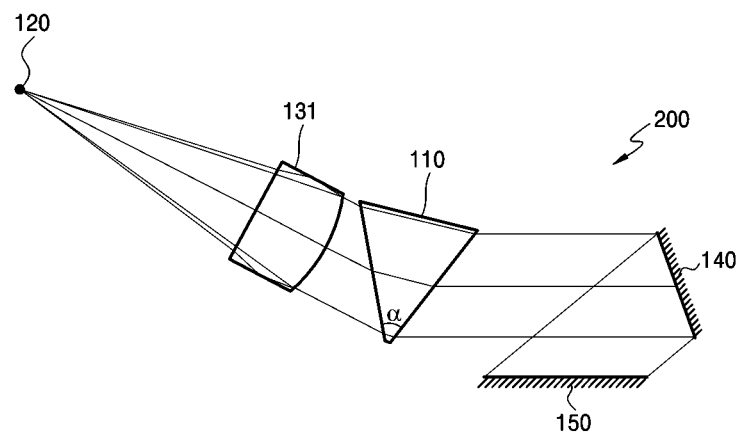
FIG. 8 is a cross-sectional view showing the image display device of FIG. 7 according to an example embodiment.

The parallel light generator 130 may cause the light emitted from the optical scanner 120 to travel in rays parallel to each other. The parallel light generator 130 may include a parabolic mirror. When the light emitted from a focal position of the parallel light generator 130 is reflected at each point of the parallel light generator 130, the traveling direction of each reflected light may be parallel to the optical axis of the parallel light generator 130. Therefore, by arranging the optical scanner 120 at the focal position of the parallel light generator 130, the light emitted from the optical scanner 120 may be reflected by the parallel light generator 130 and be parallel light traveling in a parallel direction. Also, a member other than the parabolic mirror may be used as long as the member may make the light emitted from the optical scanner 120 parallel to the optical axis. For example, FIGS. 7 and 8 show an image display device 200 that uses a condenser lens 131 instead of the parabolic mirror. Further, for example, a collimator lens may be used instead of the parabolic mirror. However, example embodiments are not limited thereto. The parallel light reflected from the parallel light generator 130 may be incident on the prism 110.

The prism 110 may be refract the light reflected by the parallel light generator 130. The prism 110 may be, for example, a wedge prism having an apex angle α. The prism 110 may be provided on a path of each light traveling from the optical scanner 120 to the light direction changer 150 and may adjust the optical path difference of each light from the optical scanner 120 to the light direction changer 150 through refraction to be 0 or less than a predetermined value. Therefore, the image display devices 100 and 200 may adjust a difference in a beam diameter of the light direction changer 150 to be 0 or less than a predetermined value.

In FIGS. 1 and 2, the prism 110 is illustrated as a triangular prism having a triangular shape in which the apex angle α is not a right angle, but is not limited thereto. More specifically, as long as the optical path difference of each laser beam is adjusted to be 0 or less than the predetermined value, a rectangular prism in which the apex angle α is a right angle may be used, or a prism having any polyhedral shape may be used. Further, the laser beam transmitted through the prism 110 may be incident on the plane mirror 140. The apex angle α of the prism 110 capable of adjusting the optical path difference to be 0 or less than the predetermined value will be described later.

The plane mirror 140 may be provided between the prism 110 and the light direction changer 150 and may reflect the light that passed through the prism 110 and allow the light to be incident on the light direction changer 150. The plane mirror 140 may reflect the parallel laser beam transmitted through the prism 110 and allow the parallel laser beam to be incident on the light direction changer 150 while maintaining a parallel state.

The light direction changer 150 may include a pattern element. The light direction changer 150 may include a plurality of points where the parallel light refracted by the prism 110 and reflected by the plane mirror 140 is incident thereon. The pattern element may include a predetermined pattern on a surface. Examples of the pattern will be described later with reference to FIGS. 11 to 17. The traveling direction of the laser beam reflected by the plane mirror 140 may be changed by reflection or diffraction by the pattern of the pattern element. For example, by adjusting intervals of slits and an aspect ratio of the pattern element, the traveling direction of the light reflected from the plane mirror 140 may be changed to the front direction with respect to the pattern element.

The material of the pattern element is not particularly limited. For example, a wire grid may be used to form the predetermined concave-convex pattern on a surface of the pattern element.

Figure 3:
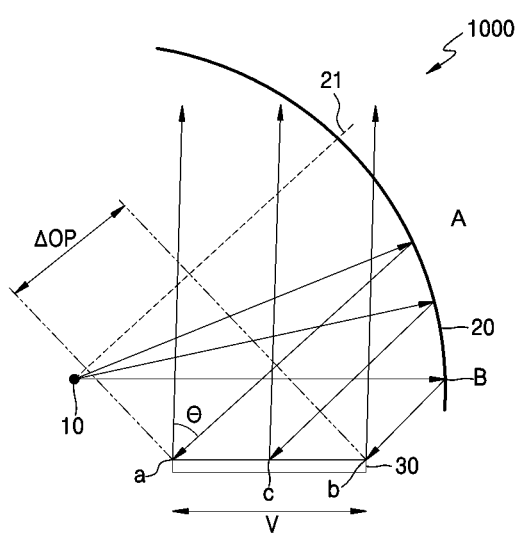
FIG. 3 is a cross-sectional view showing a configuration example of an image display device according to a related example.

FIG. 3 is a cross-sectional view showing a configuration example of an image display device 1000 according to a related example.

Figure 4:
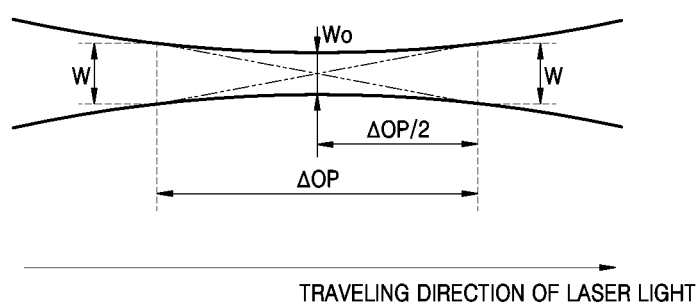
FIG. 4 is a diagram for explaining a change in a beam diameter of a laser beam propagated by the image display device of FIG. 3 according to an example embodiment.

FIG. 4 is a diagram for explaining a change in a beam diameter of a laser beam propagated by the image display device 1000 of FIG. 3.

Referring to FIG. 3, the image display device 1000 may include a MEMS mirror 10, a parabolic mirror 20, and a pattern element 30. In the related example, a prism included in an example embodiment is not provided. Light, for example, a laser beam emitted from the MEMS mirror 10 may be incident on the pattern element 30 as parallel light that is parallel to an optical axis 21 by the parabolic mirror 20. The pattern element 30 may change the traveling direction of the incident parallel light and project the parallel light onto a screen.

An optical path difference of a laser beam may occur in the image display device 1000, which may cause a difference in resolution of the screen. More specifically, an optical path of a laser beam reflected at a point A of the parabolic mirror 20 and incident on a surface end point a of the pattern element 30 may be greater by an optical path difference ΔOP than an optical path of a laser beam reflected at a point B of the parabolic mirror 20 and incident on a surface end point b of the pattern element 30. For example, when a length V of the pattern element 30 from the end point a to the end point b is 83.2 mm and an incidence angle θ is 50.0 degree, the optical path difference ΔOP may be about 63.735 mm by Equation 1 below.

$$\Delta OP = \cos(90-\theta) \cdot V \quad \text{(Equation 1)}$$

FIG. 4 shows a beam diameter along the traveling direction of the laser beam. Referring to FIG. 4, light having a strong directivity such as the laser beam and that propagates straight ahead may have the beam diameter gradually narrowing to a certain position and then gradually widening. Here, the beam diameter of the position where the beam diameter is the narrowest is referred to as a beam waist Wo. Resolution may be the highest at the beam waist Wo. Further, beam diameters before and after the beam waist Wo may have a similarity relationship.

Referring to FIG. 3, to maximize the resolution of a display image generated on a surface of the pattern element 30, a position of each optical element may be necessarily adjusted such that the beam waist Wo is positioned on the surface of the pattern element 30. When the beam waist Wo is adjusted to be located at a center point c (the center point between the end points a and b) of the surface of the pattern element 30 (that is, the beam diameter at the center point c is Wo) the resolution of the display image of the center point c may be the highest. For example, in case where an optical path difference between the light incident on the end point a or b and the light incident on the center point c is ΔOP/2, a beam diameter W of the end point a and the end point b may be greater than the beam waist Wo. In this case, the resolution of a display image of the end point a and the end point b may be lower than the resolution of the display image of the center point c.

Meanwhile, the beam waist Wo in the case of assuming an ideal Gaussian beam may be calculated by Equation 2 below. The beam diameter W of the end point a and the end point b may be calculated by Equation 3 below. In Equation 2, A denotes a wavelength of the laser beam.

$$Wo = 2 \cdot \left(\left(\frac{\Delta OP}{2}\right) \cdot \frac{\lambda}{\pi}\right)^{\frac{1}{2}} \quad \text{(Equation 2)}$$

$$W = Wo \cdot 2^{\frac{1}{2}} \quad \text{(Equation 3)}$$

FIG. 5 is a table showing a specific example of the relationship between the incidence angle θ of a laser beam with respect to the pattern element 30, the maximum optical path difference ΔOP of the laser beam, and a difference in beam diameters of the image display device 1000 of FIG. 3.

The optical path difference ΔOP shown in FIG. 5 may be obtained by using Equation 1, and the length V from the end point a to the end point b of the pattern element 30 may be 83.2 mm.

Referring to FIG. 5, the relationship of the incidence angle θ, the optical path difference ΔOP, the beam waist Wo may be calculated by using Equation 2, and the beam diameter W may be calculated by using Equation 3. For example, the laser beam may be incident on the pattern element 30 such that the incident angle θ is 7.7 degrees. In this case, the maximum optical path difference ΔOP may be 11.171 mm, the beam waist Wo may be 0.061 mm, and the beam diameter W may be 0.086 mm at a point away from the beam waist Wo by ΔOP/2. The larger the incident angle θ, the greater the difference in the beam diameter on the surface of the pattern element 30, and thus lower the resolution of a display image. Also, the beam waist Wo and the beam diameter W of FIG. 5 may be calculated when the wavelength A of Equation 2 is about 523 nm.

As described with reference to FIGS. 3, 4, and 5, the image display device 1000 may have a non-uniform resolution according to an optical path difference occurring between laser beams incident on the pattern element 30 and a characteristic of the beam diameter W varying depending on traveling position of the laser beam. Meanwhile, the image display device 100 according to an example embodiment of FIGS. 1 and 2 may have a uniform resolution by including the prism 110 adjusting the optical path difference between laser beams and reducing or eliminating the optical path difference.

FIG. 6 is a table showing a specific example of a relationship between the incidence angle θ of a laser beam with respect to the light direction changer 150 of FIGS. 1 and 2, a maximum optical path difference ΔOP of the laser beam, and the apex angle α.

As described above, the prism 110 may adjust an optical path difference of each light from the optical scanner 120 to the light direction changer 150. The prism 110 may adjust the optical path difference to be 0 or less than a predetermined value. Therefore, the image display device 100 may adjust a difference in a beam diameter of the light direction changer 150 to 0 or less than the predetermined value.

For example, the image display device 100 may change the beam diameter W in the light direction changer 150 to be the same as the beam waist Wo. An optical path length L of the prism 110 (the traveling path of light in the vacuum) may be calculated from Equation 4 below by a path length D (the actual length through which light travels) of the prism 110 and a refractive index n of the prism 110.

$$L = n \cdot D \quad \text{(Equation 4)}$$

In other words, when the prism 110 has the refractive index n larger than 1, the optical path length L may be greater than the path length D. This principle may be used to adjust the optical path difference of the light traveling in a plurality of paths. The installation position and the installation angle of each member and the apex angle α of the prism 110 may be determined such that the optical path difference is 0 or less than the predetermined value.

For example, when the length V from one end of the light direction changer 150 to the other end is 83.2 mm and the incidence angle θ of the laser beam with respect to the light direction changer 150 is 50.0 degree, the maximum optical path difference ΔOP may be 63.735 mm according to Equation 1. The apex angle α of the prism 110 that makes the maximum optical path difference ΔOP almost zero may be determined as 57.15 degree. Also, FIG. 6 is only an example, and each value may vary depending on the installation position and the installation angle of each member.

When the refractive index n is greater than 1, a material of the prism 110 is not particularly limited. For example, the material of the prism 110 may include glass, resin, or the like. Since the Abbe number of glass tends to be greater than that of resin, the difference in the refractive index n caused by the wavelength difference of the laser beam may be reduced by using glass as the material of the prism 110. Also, it may be easier to process glass than resin in a plane manner.

FIG. 7 is a perspective view showing an image display device 200 according to an example embodiment.

FIG. 8 is a cross-sectional view showing the image display device 200 of FIG. 7.

Referring to FIGS. 7 and 8, the image display device 200 is the same as the image display device 100 shown in FIGS. 1 and 2, except that the parallel light generator 130 of FIGS. 1 and 2 is replaced by a condenser lens 131.

Figure 9:
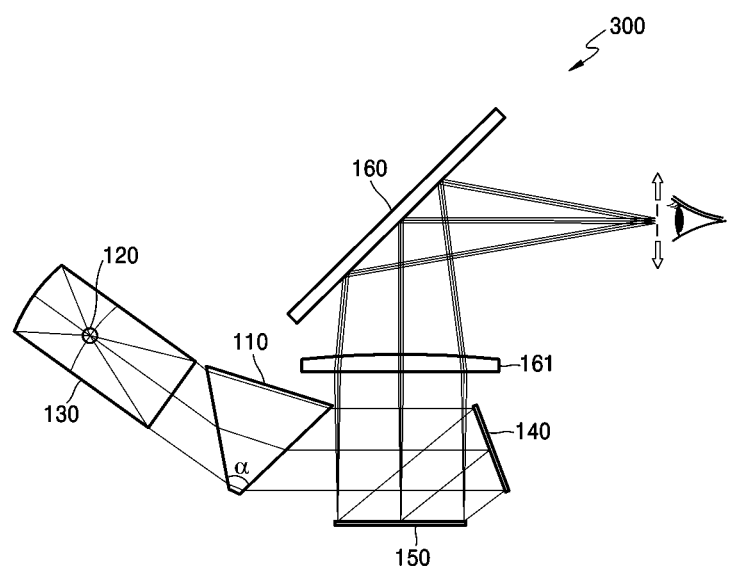
FIG. 9 is a cross-sectional view showing an image display device according to an example embodiment.

FIG. 9 is a cross-sectional view showing an image display device 300 according to an example embodiment.

Referring to FIG. 9, the image display device 300 may include a translucent screen 160 at the front end of the light direction changer 150 and an optical system 161 between the light direction changer 150 and a screen 160. The optical system 161 may allow a laser beam to be incident on the screen 160. Accordingly, the image display device 300 may function as a head-up display. The screen 160 may display a virtual image by using the laser beam incident through the optical system 161. A user may recognize the virtual image.

Figure 10:
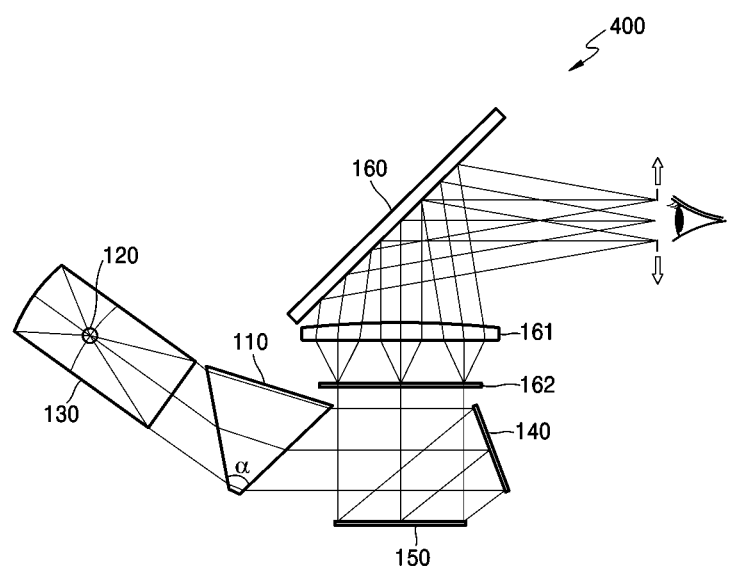
FIG. 10 is a cross-sectional view showing an image display device according to an example embodiment.

FIG. 10 is a cross-sectional view showing an image display device 400 according to an example embodiment.

Referring to FIG. 10, the image display device 400 may further include a diffuser 162 between the light direction changer 150 and the optical system 161. Accordingly, a laser beam incident from the light direction changer 150 may be focused on the diffuser 162. The diffuser 162 may serve as a secondary image plane. The diffuser 162 may diffuse the incident laser beam, thereby expanding a visual region which is a region where a display image may be recognized. Also, the configurations of FIGS. 9 and 10 are merely examples, and the arrangement of the screen 160, the optical system 161, and the diffuser 162 may be changed.

Also, the configurations discussed above are merely examples, and the configurations of the image display devices 100, 200, 300, and 400 are not limited thereto. For example, the image display devices 100, 200, 300, and 400 may not include the plane mirror 140. More specifically, when each laser beam is incident on a surface of the light direction changer 150 at the predetermined incident angle θ or the optical path difference of each laser beam is close to 0, the plane mirror 140 may be omitted.

Also, the above-described example embodiments may be applied to any image display device other than a head-up display. For example, the image display devices 100, 200, 300, and 400 may include a projection optical system at the front end of the light direction changer 150 to serve as a projector. As described above, the image display devices 100, 200, 300, and 400 may include an arbitrary optical system at the front end of the light direction changer 150 to operate as different types of image display devices.

Figure 11:
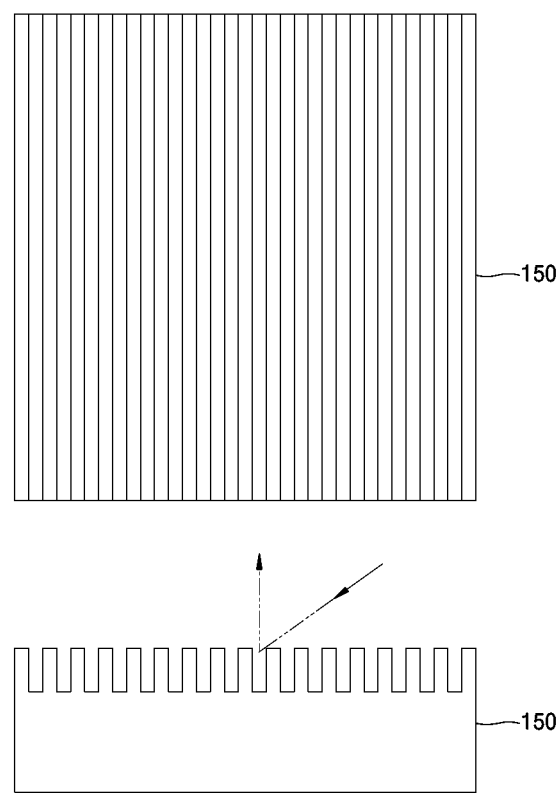
FIG. 11 shows a modification of a light direction changer included in image display devices according to example embodiments.

FIG. 11 shows a top view and a cross-sectional view of a modification of the light direction changer 150 included in the image display devices 100, 200, 300, and 400 according to example embodiments.

Referring to FIG. 11, the light direction changer 150 may include a reflective type pattern element. The light direction changer 150 may have a wire grid or the like on its surface to form a pattern. For example, the light direction changer 150 may have a shape in which a plurality of rectangular shape prisms are disposed in parallel such that the prisms face a front direction with respect to the light direction changer 151. Intervals of slits and an aspect ratio of the pattern may be determined such that the traveling direction of a first order diffracted ray is a front direction with respect to the light direction changer 150. Also, the traveling direction of a laser beam changed by the light direction changer 150 is not limited to the front direction with respect to the light direction changer 150 and may be changed according to the configurations of the image display devices 100, 200, 300, and 400.

Figure 12:
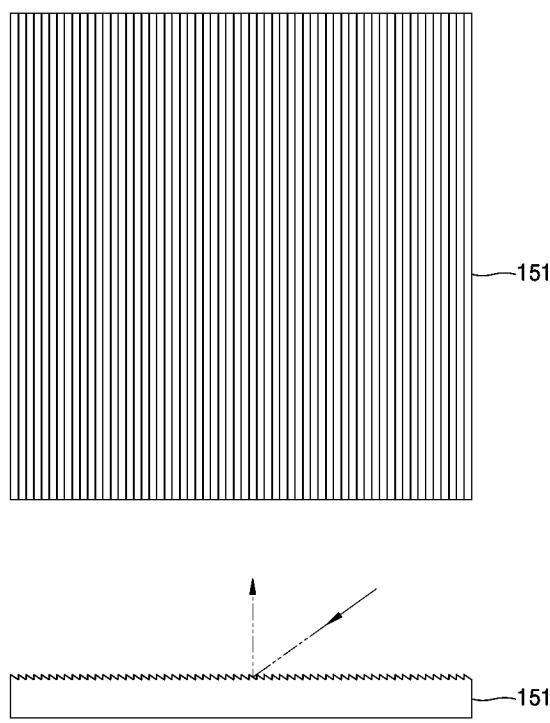
FIG. 12 shows a modification of a light direction changer included in image display devices according to example embodiments.

FIG. 12 shows a top view and a cross-sectional view of a modification of a light direction changer 151 included in the image display devices 100, 200, 300, and 400 according to example embodiments.

Referring to FIG. 12, the light direction changer 151 may include a reflective type pattern element having a pattern of a rectangular prism shape on its surface. For example, the light direction changer 151 may have a shape in which a plurality of sawtooth shape prisms are disposed in parallel such that the prisms face a front direction with respect to the light direction changer 151. The light direction changer 151 may change the traveling direction of a laser beam to a predetermined first direction by reflecting the laser beam on an inclined surface formed on the surface.

Figure 13:
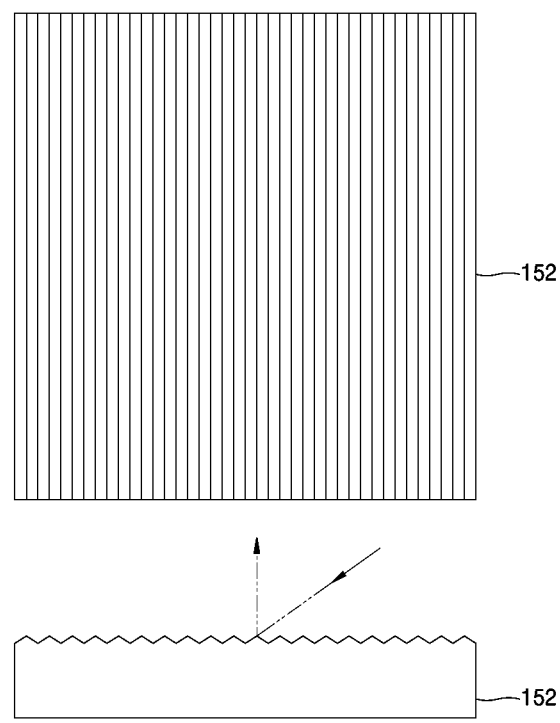
FIG. 13 shows a modification of a light direction changer included in image display devices according to example embodiments.

FIG. 13 shows a top view and a cross-sectional view of a modification of a light direction changer 152 included in the image display devices 100, 200, 300, and 400 according to example embodiments.

Referring to FIG. 13, the light direction changer 152 may include a reflective type pattern element having a pattern of a prism shape on its surface. More specifically, the light direction changer 152 may have a shape in which a plurality of triangular prisms are disposed in parallel such that the apex angle α is directed forward with respect to the light direction changer 152. The light direction changer 152 may change the traveling direction of a laser beam to a predetermined first direction by reflecting the laser beam on an inclined surface formed on the surface.

Figure 14:
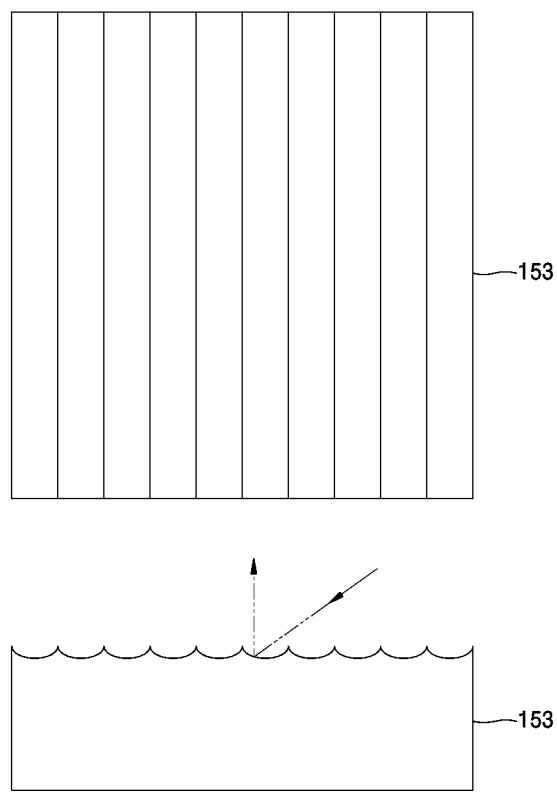
FIG. 14 shows a modification of a light direction changer included in image display devices according to example embodiments.

FIG. 14 shows a top view and a cross-sectional view of a modification of a light direction changer 153 included in the image display devices 100, 200, 300, and 400 according to example embodiments.

Referring to FIG. 14, the light direction changer 153 may include a reflective type pattern element having a pattern of a plurality of cylindrical shapes disposed in parallel on its surface. The cylindrical shape includes a semi-cylindrical shape in which a part of a cylinder is cut off. The light direction changer 153 may change the traveling direction of a laser beam by reflecting the laser beam on the surface of the cylindrical shape. Also, since the light direction changer 153 has the semi-cylindrical shape on the surface, the laser beam may be reflected and then travel, be diffused, in various directions according to a position where the laser beam is reflected from. Therefore, the light direction changer 153 may expand a visual region.

Figure 15:
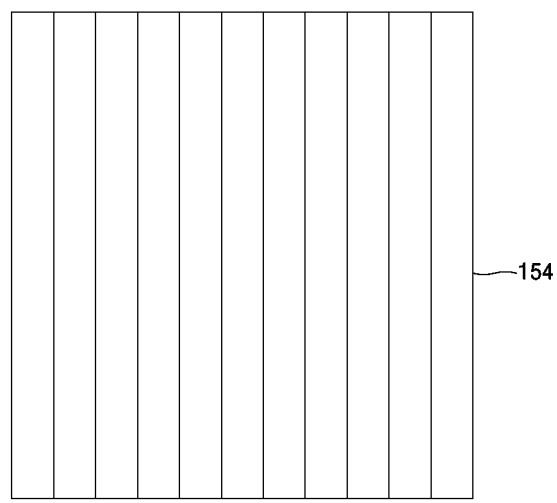
FIG. 15 shows a modification of a light direction changer included in image display devices according to example embodiments.
Figure 15:
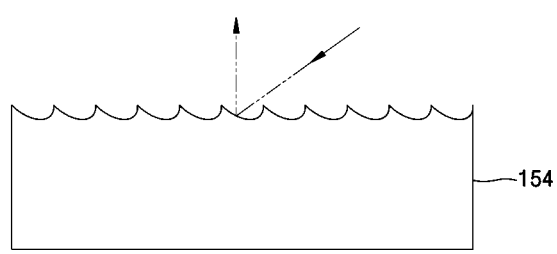

FIG. 15 shows a top view and a cross-sectional view of a modification of a light direction changer 154 included in the image display devices 100, 200, 300, and 400 according to example embodiments.

Referring to FIG. 15, the light direction changer 154 may include a reflective type pattern element having a pattern of a plurality of parabolic shapes disposed in parallel on its surface. More specifically, the light direction changer 154 may have any parabolic shape on the surface. The light direction changer 154 may change the traveling direction of a laser beam by reflecting the laser beam on the parabolic surface. Also, since the light direction changer 154 has the parabolic shape on its surface, the laser beam may be reflected and then travel, be diffused, in various directions according to a position where the laser beam is reflected from. Therefore, the light direction changer 154 may expand a visual region, like the light direction changer 153 of FIG. 14.

Figure 16:
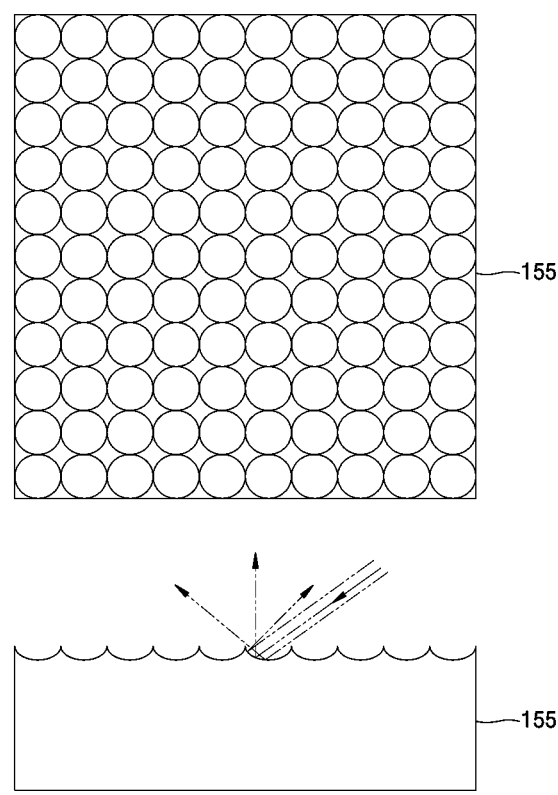
FIG. 16 shows a modification of a light direction changer included in image display devices according to example embodiments.

FIG. 16 is a top view and a cross-sectional view showing a modification of a light direction changer 155 included in the image display devices 100, 200, 300, and 400 according to example embodiments.

Referring to FIG. 16, the light direction changer 155 may include a reflective type lattice element having a pattern of a spherical concave lens array shape on its surface. The light direction changer 155 may change the traveling direction of a laser beam by reflecting the laser beam on the surface. Further, since the light direction changer 155 has a surface shape where spherical concave lenses are arranged in a lattice array shape, the laser beam may be reflected and then travel, be diffused, in various directions according to a position where the laser beam is reflected. Therefore, the light direction changer 155 may expand a visual region, like the light direction changer 153 of FIG. 14.

Figure 17:
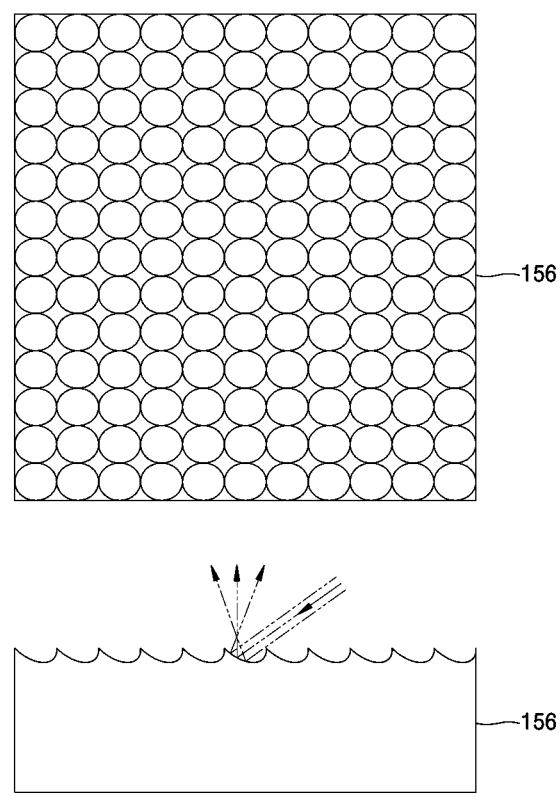
FIG. 17 shows a modification of a light direction changer included in image display devices according to example embodiments.

FIG. 17 is a top view and a cross-sectional view showing a modification of a light direction changer 155 included in the image display devices 100, 200, 300, and 400 according to example embodiments.

Referring to FIG. 17, the light direction changer 156 may include a reflective type lattice element having a pattern of a parabolic concave lens array shape on its surface. The light direction changer 156 may change the traveling direction of a laser beam by reflecting the laser beam on the surface. Further, since the light direction changer 156 has a surface shape like that parabolic concave lenses are arranged in a lattice array shape, the laser beam may be reflected and then travel, be diffused, in various directions according to a position where the laser beam is reflected. Therefore, the light direction changer 156 may expand a visual region, like the light direction changer 153 of FIG. 14.

Also, the surface of the parabolic concave shape may have a characteristic of reflecting parallel light and converging light at a focus position. That is, since the laser beam reflected from the surface of the parabolic concave shape converges at a focus position of each parabolic surface, a second focal plane may be generated by the convergence of focus positions of parabolic surfaces. Thereby, the image display device 100 may allow a user to recognize as if a display image is being projected on a plurality of focal planes. In other words, the image display device 100 may realize the 3D display by controlling the display content time-serially according to a direction in which the laser beam is reflected by the light direction changer 156.

Also, a material and a manufacturing method of each member used as the light direction changers 150 to 156 described with reference to FIGS. 11 to 17 are not particularly limited.

As described above, each of the image display devices 100, 200, 300, and 400 according to example embodiments may include the optical scanner 120 scanning light emitted from a light source, the parallel light generator 130 generating the scanned light as parallel light, the prism 110 refracting the parallel light, and the light direction changer 150 changing the traveling direction of the light. The prism 110 may adjust the optical path difference of each light to be substantially 0 or less than a predetermined value. Therefore, the image display devices 100, 200, 300, and 400 may adjust the difference in the beam diameter on the light direction changer 150 to be substantially 0 or less than the predetermined value. For example, the image display device 100 may change the beam diameter on the light direction changer 150 to be the same as a diameter of the beam waist $W_0$.

According to example embodiments of the present disclosure, uniformity of resolution of a display by an image display device may be improved.

It should be understood that embodiments described herein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. An image display device comprising:
   an optical scanner configured to scan light emitted from a light source;
   a parallel light generator configured to generate the scanned light as parallel light;
   a prism configured to refract the parallel light and output the parallel light refracted; and
   a light direction changer comprising a plurality of points whereon the parallel light refracted and output by the prism is incident, and configured to reflect or diffract the parallel light and change a traveling direction of the parallel light,
   wherein the prism is provided on a path of each light traveling from the optical scanner to the light direction changer, and is configured to adjust an optical path difference of parallel light incident on each of the plurality of points of the light direction changer, and
   wherein the prism comprises a first surface on which the parallel light is incident and a second surface through which the parallel light refracted is output external to the prism and is configured to adjust the optical path difference such that differences between optical paths of every ray of the parallel light incident on the plurality of points of the light direction changer are less than a predetermined value.

2. The image display device of claim 1, wherein the prism comprises a wedge prism.

3. The image display device of claim 1, wherein the prism comprises glass or resin.

4. The image display device of claim 1, wherein the optical scanner comprises a micro electro mechanical systems (MEMS) mirror.

5. The image display device of claim 1, wherein the parallel light generator comprises a parabolic mirror.

6. The image display device of claim 1, wherein the parallel light generator comprises a condenser lens.

7. The image display device of claim 1, further comprising:
   a plane mirror provided between the prism and the light direction changer, and configured to reflect light refracted from the prism to be incident on the light direction changer.

8. The image display device of claim 1, further comprising:
   a screen on which light having a traveling direction changed by the light direction changer is incident; and
   an optical system provided between the screen and the light direction changer and configured to guide the light to be incident on the screen.

9. The image display device of claim 8, further comprising:
   a diffuser between the light direction changer and the optical system, wherein the diffuser is configured to diffuse the light incident from the light direction changer.

10. The image display device of claim 1, wherein the scanned light which is scanned by the optical scanner is not parallel.

11. The image display device of claim 1, wherein the prism is configured to adjust the optical path difference such that the differences between the optical paths of every ray of the parallel light incident on the plurality of points of the light direction changer is less than a difference between optical paths of every ray of the parallel light output from on the plurality of points of the parallel light generator.

12. The image display device of claim 1, wherein the prism is configured to adjust the optical path difference such that the differences between the optical paths of every ray of the parallel light incident on the plurality of points of the light direction changer is 0.

13. The image display device of claim 1, wherein the prism outputs the parallel light incident through the first surface external to the prism through the second surface without a total internal reflection.

14. The image display device of claim 1, wherein the first surface and the second surface are configured to form an apex angle therebetween.

* * * * *